US007599922B1

(12) United States Patent
Chen et al.

(10) Patent No.: US 7,599,922 B1
(45) Date of Patent: Oct. 6, 2009

(54) SYSTEM AND METHOD FOR FEDERATED SEARCHING

(75) Inventors: Zhanliang (John) Chen, Sammamish, WA (US); Christopher C. McConnell, Redmond, WA (US); Igor I. Rondel, Redmond, WA (US); Scott A. Thurlow, Kirkland, WA (US); Siddhartha Cingh Arora, Redmond, WA (US); Thomas D. White, Carnation, WA (US); Tobin D. Baker, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 94 days.

(21) Appl. No.: 10/305,446

(22) Filed: Nov. 27, 2002

(51) Int. Cl.
G06F 17/30 (2006.01)
(52) U.S. Cl. .................... 707/4; 707/5; 707/10
(58) Field of Classification Search ............... 707/2, 707/3, 4, 5, 10, 101; 705/1, 26; 715/212, 715/221, 224, 225, 234; 704/5, 6, 7
See application file for complete search history.

(56) References Cited

U.S. PATENT DOCUMENTS

| 6,078,914 | A  | * | 6/2000  | Redfern ........................ 707/3 |
| 6,144,958 | A  | * | 11/2000 | Ortega et al. ................... 707/5 |
| 6,578,046 | B2 | * | 6/2003  | Chang et al. .................. 707/10 |
| 6,643,633 | B2 |   | 11/2003 | Chau et al. |
| 6,725,231 | B2 |   | 4/2004  | Hu et al. |
| 6,757,869 | B1 |   | 6/2004  | Li et al. |
| 6,772,413 | B2 |   | 8/2004  | Kuznetsov |
| 6,775,680 | B2 |   | 8/2004  | Ehrman et al. |
| 6,947,920 | B2 | * | 9/2005  | Alpha ........................... 707/1 |
| 7,099,871 | B2 | * | 8/2006  | Faybishenko et al. ......... 707/10 |
| 2003/0106021 | A1 |   | 6/2003 | Mangrola |
| 2003/0187841 | A1 | * | 10/2003 | Zhang et al. |
| 2003/0212673 | A1 | * | 11/2003 | Kadayam et al. |
| 2004/0093321 | A1 | * | 5/2004 | Roustant et al. |

* cited by examiner

Primary Examiner—Greta L Robinson
(74) Attorney, Agent, or Firm—Woodcock Washburn LLP

(57) ABSTRACT

A method and system for federated searching that includes receiving a user query a first location, extracting terms from the user query, assigning the query a ranking based on the terms, sending the user query to a second location for resolution if the ranking of the query meets a predetermined threshold, and receiving a response from the second location. The user query is parsed, normalized and ranked to determine if terms in the user query are relevant to the search facility of the second location. In order to make that ranking determination, data representative of the goods or services provided by the second location is provided to the first location by the second location. A data structure is built to allow an original value provided by the second location and the slot wherein the original value is expected to be indexed by all possible values for the original value by determining substantially all possible values for the original value. Relevant synsets are determined for the data, wherein terms within the synsets are associated to a term that was provided by the second location, and wherein a class of the data is preserved.

23 Claims, 5 Drawing Sheets

SYSTEM AND METHOD FOR FEDERATED SEARCHING

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2002, Microsoft Corporation, All Rights Reserved.

FIELD OF THE INVENTION

This invention relates in general to the field of information storage and retrieval. More particularly, this invention relates to a system and method of searching wherein a user query is evaluated and federated to a appropriate site for resolution in accordance with terms within the user query.

BACKGROUND OF THE INVENTION

Internet search engines, such as MSN® Search, serve as information gateways to Internet users by accumulating and categorizing information, and providing a wide array of services. Specialized Internet businesses ("partners") often seek to drive highly qualified traffic to their sites by partnering with Internet search engines in order to improve the indexing of their content. This approach helps to draw traffic, but has several drawbacks. One is that in order to achieve good indexing, the partners' web pages typically must be tagged with good keywords and phrases and have good summaries. Generally, determining these keywords and phrases, and writing these summaries is not in the core competency of the Internet businesses, i.e., they know how to manage their business, but not how to prepare data for searching by users.

Another problem is that the latency of updating the index created by the search engine can be quite long. It is possible that individual web pages may be indexed as infrequently as once every couple of months. A tremendous amount of information can change in that time period, such as pricing and inventory, thus limiting the quality of the indexed data.

Yet another problem is that many partners' websites are data-driven or dynamic. This means that they do not actually have physical pages for all their content on their site, but rather generate the pages from a database in response to user queries. Dynamic content is very difficult for search engines to discover and index.

Another problem associated with partnering with search engines is that search engines handle significantly more traffic than the partners' sites. If all queries were forwarded to the partners for resolution, the partners would have to make substantial hardware and network infrastructure investments just to handle the traffic. Meanwhile, most queries would be irrelevant as only a very small percentage of the total traffic would be for the goods and services offered by the partner.

Many conventional implementations for searching partner websites attempt to address this irrelevance problem by requiring the end-user to specify the websites that should be searched or by linking the searching to categories in a taxonomy. Both of these approaches require that the user either implicitly or explicitly select the websites to be searched. Given the large number of websites, this approach quickly overwhelms the user by requiring them to do burdensome setup work just to perform what they perceive as a simple search.

Complicating this further is that end-users are very imperfect in how they formulate queries. In particular, queries often contain misspelled entries, acronyms, improper spacing between words, etc. A cursory study of the ways that users searched for hotels using the MSN Search® service in April 2002 indicates that approximately 50% of the queries were malformed. Typically, websites do not support searching for content where the queries are malformed since they index only the properly formed content on their site.

Thus, in view of the foregoing, there is a need for systems and methods that overcome the limitations and drawbacks of the prior art. In particular, there is a need for system whereby end-users can search against partners' content at Internet search engines. There is also a need for a system that can correct malformed queries and structure such queries for resolution by partners without overwhelming partners with irrelevant requests for information. The present invention provides such a solution.

SUMMARY OF THE INVENTION

The present invention is directed to a platform for federating searches to partners made by users at Internet search engine websites.

In accordance with an aspect of the invention, there is provided a method of federated searching that includes receiving a user query at a first location, extracting and normalizing terms from the user query, assigning the query a ranking based on the terms, sending the user query to a second location for resolution if the ranking of the query meets a predetermined threshold, and receiving a response from the second location.

In accordance with a feature of the invention, extracting terms from the user query includes parsing the user query on a term-by-term basis, determining if terms in the user query are relevant to individual slots utilized by a search facility of the second location, and filling the slots with the appropriate terms in the user query. Terms in the user query may be determined as relevant by referencing a staging database to find all substrings of the user query. Terms may be normalized to forms such that the second location can interpret the user query. Normalization includes at least one of correcting spelling errors in the user query, correcting spacing errors in the user query, and determining a class of the terms within the user query. The user query may be sent to the second location only if a predetermined number of slots are filled by terms within the user query. A nomatch score may be determined wherein the nomatch score is a percentage of the words in the user query that were not matched against the slot values or a list of words known to be relevant to the partner's business, and wherein if the nomatch score is above a predetermined nomatch threshold the user query is not sent to the second location.

In accordance with another feature of the invention, the terms may be ranked by assigning a weight to each class of terms and using the weights to determine the ranking. In addition, the classes of terms may be prioritized.

In accordance with yet another feature of the present invention, the user query is sent to the second location for resolution comprises placing the extracted and normalized terms into a predetermined URL template. Receiving a response from the second location may include receiving an XML formatted response from the second location and rendering it for display.

In accordance with another aspect of the present invention, there is provided a method of receiving data from a second location to build a template against which user queries are run for federating relevant user queries to the second location for resolution. The method includes receiving data from the second location, scrubbing the data, enhancing the data to include known variants of terms, and exporting the data to create the template of the data for use during subsequent searching.

In accordance with a feature of the invention, receiving data from the second location comprises receiving one or more data files containing data representative of the goods or services provided by the second location.

In accordance with another feature of the invention, a model representative the type of queries that the second location can answer is built and slots to be filled in the second location search submission form are determined. In addition, normalized forms for the second location data types are determined. The data may then be loaded into a staging database and a data structure is built to allow an original value provided by the second location and the slot wherein the original value is expected to be indexed by all possible variations for the original value by determining substantially all possible variations for the original value. In addition, a list of words including variants known to be relevant to the partner's business is constructed to assist in the recognition of queries.

In accordance with still another feature, scrubbing the data file comprises eliminating duplicates within the data and changing data from a display form to a search form. The display form is a form that is optimized for display to a user and a search form is a form that is entered as part of a search query. Stopwords may be eliminated from the data.

In accordance with another feature, exporting the data includes adding relevant variations to the data, wherein terms within the synsets are associated to a term that was provided by the second location, and wherein a class of the data is preserved. Trigger words, associated words and forbidden words may be defined, wherein trigger words are words that do not correspond to a second locations slot but carry the weight of a word that would fill a slot for matching purposes, wherein associated words are a synset of terms that are counted as matches to terms, but are not used for ranking, and forbidden words are a synset of terms that are known to cause false positives (the return of a result that is not relevant) in queries.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

The present invention is directed to systems and methods that provide full-featured search capabilities to Internet businesses, without necessitating the design and implementation of their own search facility.

Exemplary Computing Environment

Figure 1:
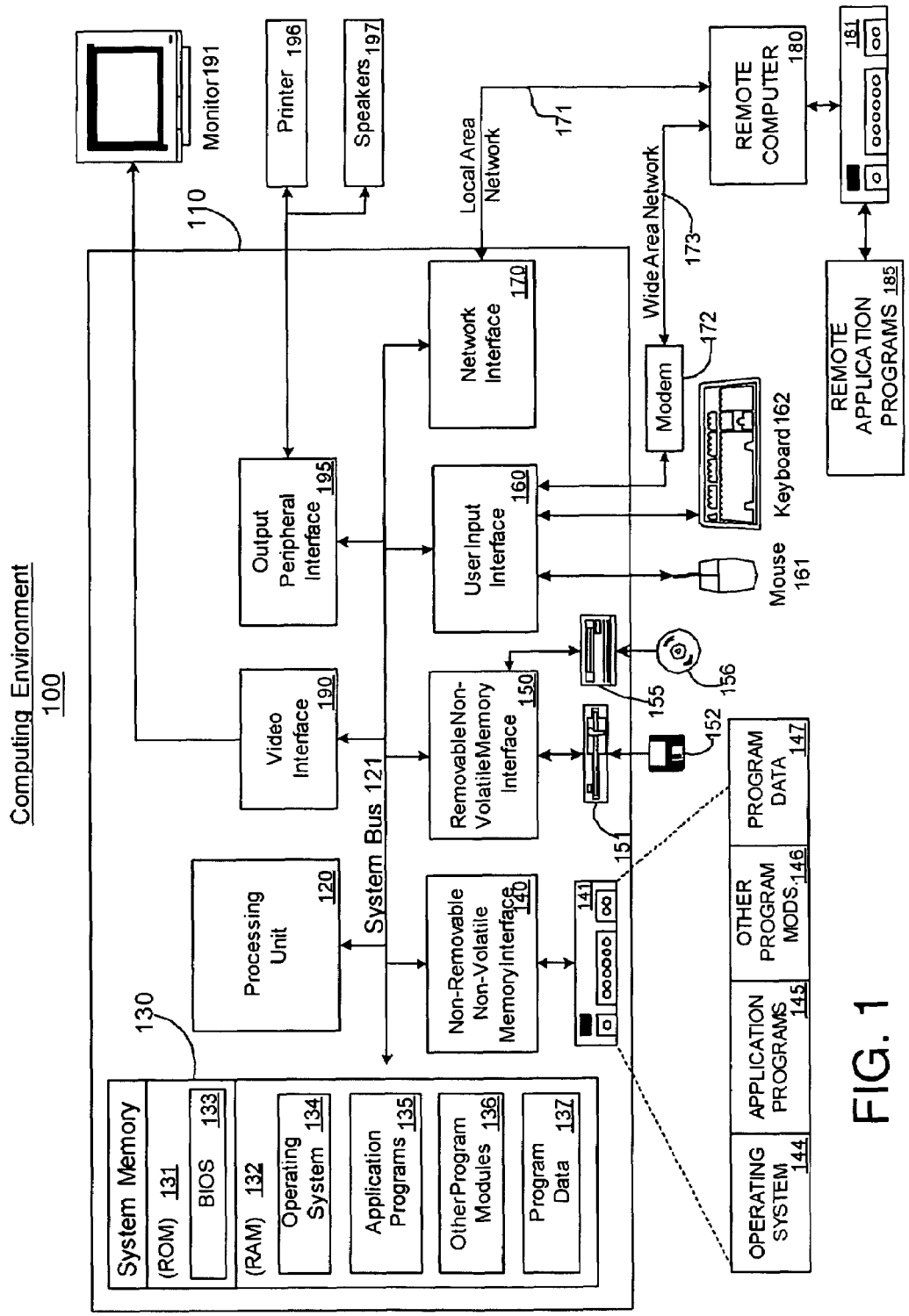
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Framework And Architecture

Overview

The concept of "federated search" addresses many of the concerns of the prior art by sending queries to one or more partners' websites for resolution rather than attempting to index all of the partners' websites content. The present invention also addresses the latency and data-driven problems that exist in the prior art by directly searching against the partners' content.

The present invention attempts to recognize the intent of the user by extracting concepts from a query, and then comparing the concepts to a model to determine the likelihood that any individual partner website contains data that is highly relevant to the search. Only the queries that are deemed to be highly relevant are federated (i.e., forwarded to a partner for resolution), thus reducing the load placed on the partner websites for handling the federated traffic and reducing the hardware and network infrastructure investment required to participate in federated search. The result is that the present invention provides a high return on investment for the partners as the extra traffic they receive will be, by definition, highly qualified. The present invention also reduces the burden on the end user because it does not require them to select the websites to which their queries should be federated as the queries are automatically federated to the websites most likely to have a relevant answer.

The present invention extracts key terms from user queries to fill "slots," thus allowing particular websites to participate in federated search with a forms-based search function rather than a free text search function. The partners typically offer a search function on their respective websites, but very rarely is the search function a text search. More often it is a form based structured search. For example, a search for hotels is often performed using form-based search where the user fills-in separate fields (i.e., slots) for the city, state, country and the name of the hotel.

To the contrary, search engines typically have a single text field where all the content for the search is entered as free text. In order to federate the search to a partner's website, the free text entry needs to be broken into individual fields for submission to the website. This process is known as slot filling. For example, in the query "Las Vegas Bellagio Hotel", the present invention recognizes that the city is "Las Vegas" and the hotel is the "Bellagio" and formulates the appropriate structured query, e.g., "city=Las+Vegas&hotel=Bellagio."

The present invention also recognizes malformed queries and normalizes such queries to their proper forms so that the partners may correctly respond to federated queries even if the user incorrectly entered the query. For example, the query "LasVegas Bellagio," which is malformed in that there is no space between Las and Vegas, is corrected to "city=Las+Vegas&hotel=Bellagio" prior to submission to the partner.

The present invention provides an improved search experience for both the end user and the partner. The partner benefits because they receive highly qualified traffic using their existing infrastructure while the end-user benefits by getting a good answer to their query.

Figure 2B:
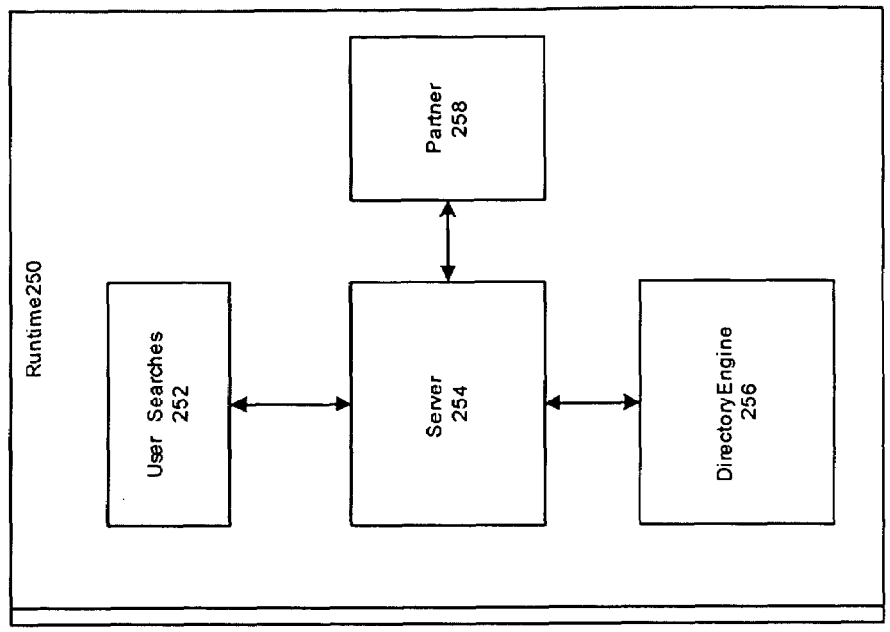
FIG. 2B illustrates an exemplary runtime environment.
Figure 2A:
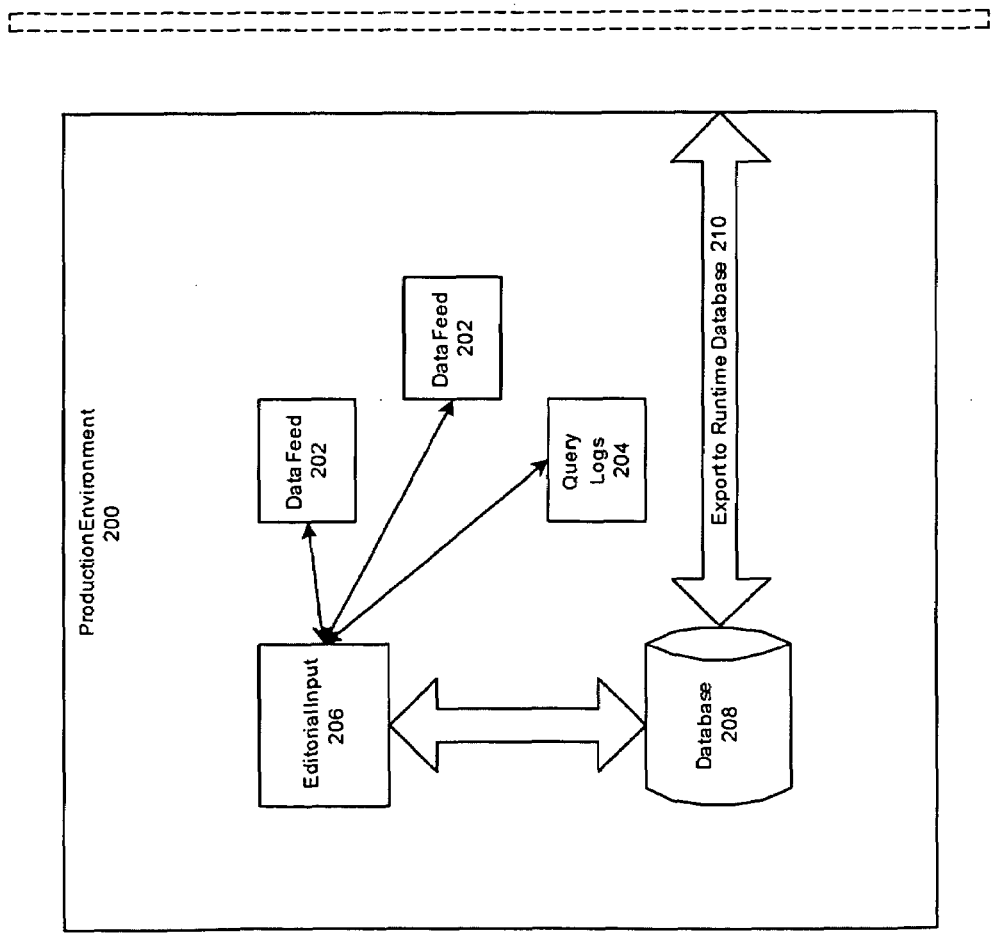
FIG. 2A illustrates an exemplary production environment.
Figure 3:
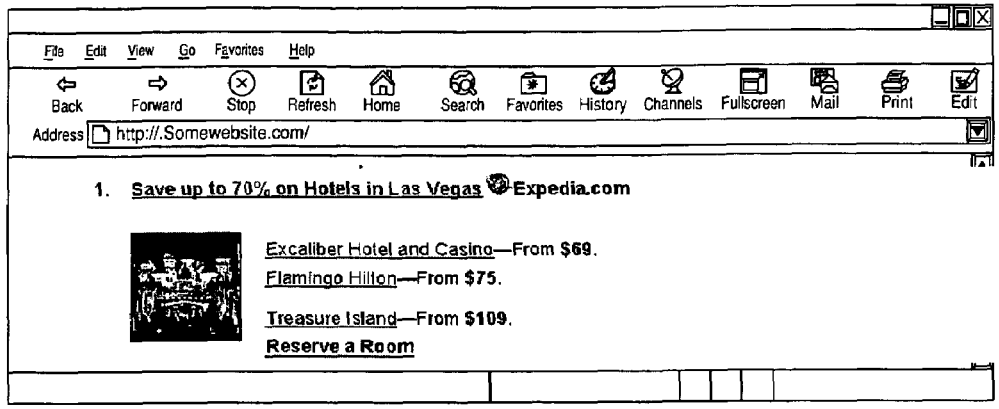
FIGS. 3-10 illustrate exemplary user interfaces in accordance with a partner's particular ranking of results.
Figure 4:
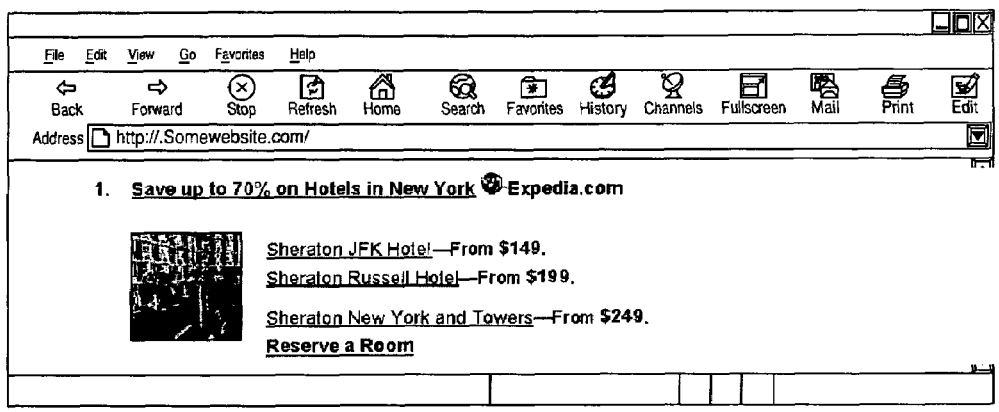
Figure 5:
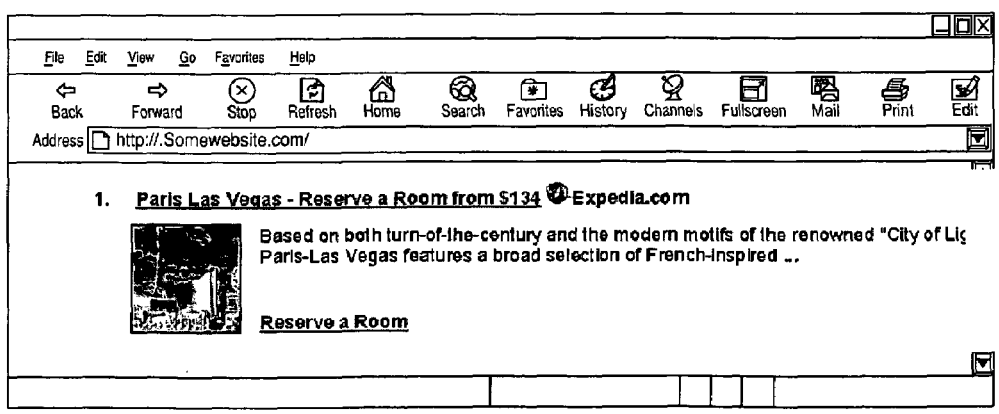
Figure 6:
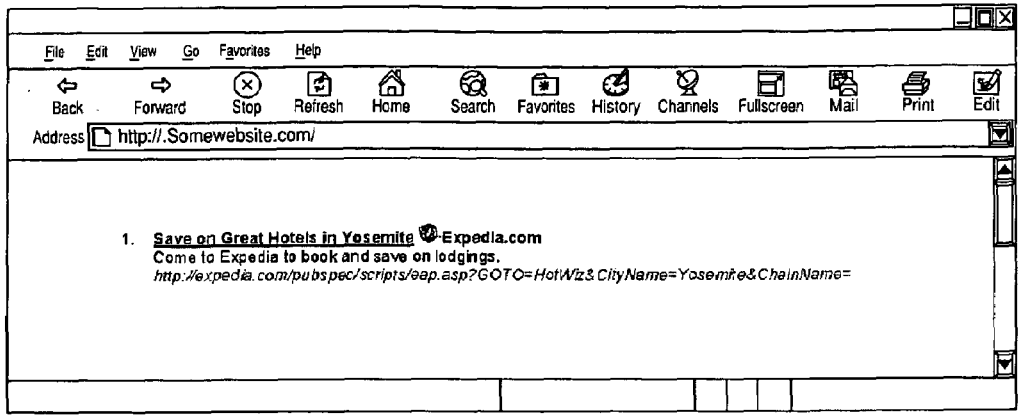
Figure 7:
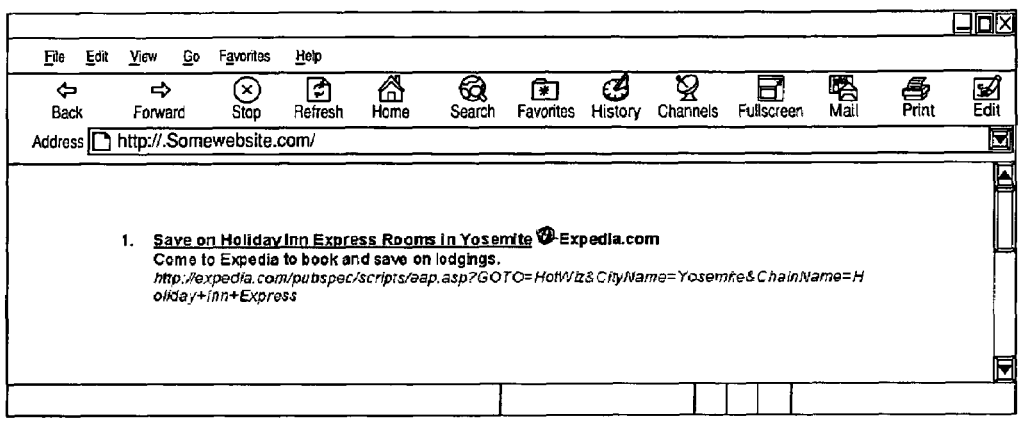
Figure 8:
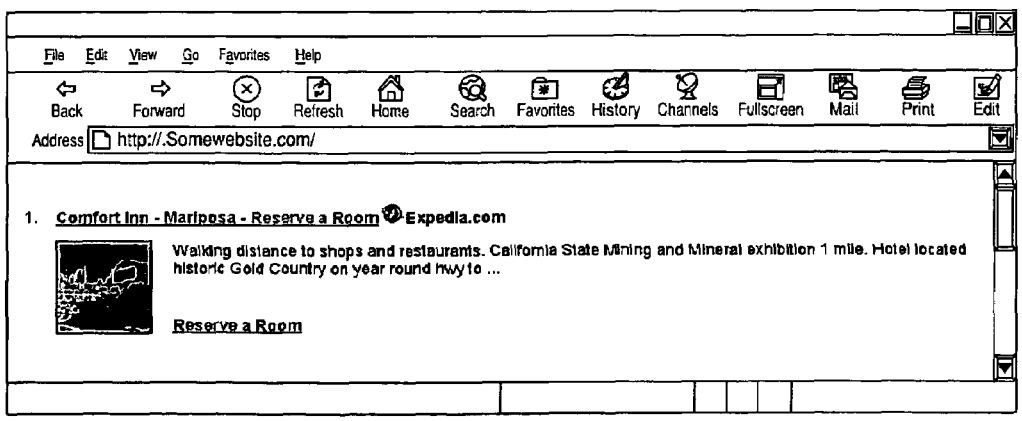
Figure 9:
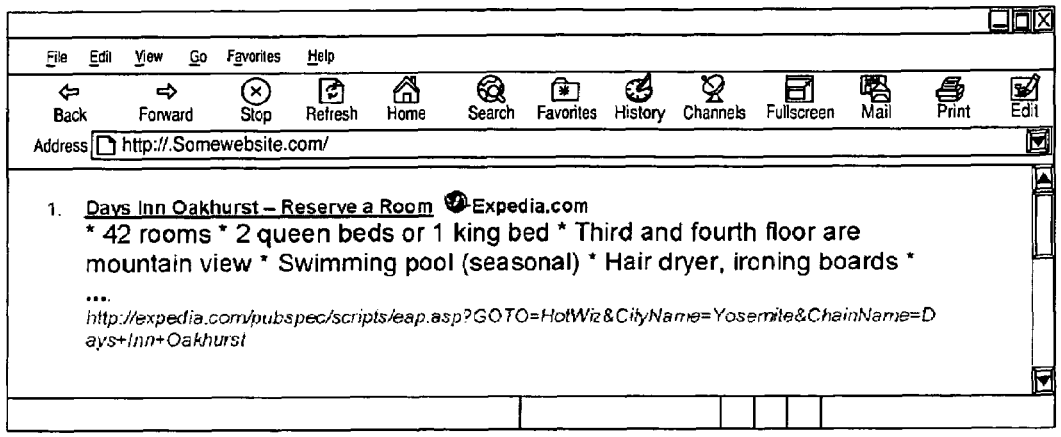

The process flow of the present invention will now be described with reference to FIG. 2. The major steps in the process flow include: receiving data from the partner (via one or more of partner/data feeds 202), scrubbing the data (including editorial input 206), and exporting the data to the search engine database (export 210). At runtime, queries are received from user searches 252 at the search engine's web server 254 and tested against a directory engine 256 containing data regarding keyphrases. If certain criteria are met, then the search is federated to a partner site 258 and results are received from the partner site 258 for display. It is noted that the process flow may include a fewer or greater number of steps. As described below, the exemplary partner is Expedia and the exemplary search engine is MSN Search®, however, the present invention may be used in conjunction with any partner or partners and/or search engines and is not limited by the exemplary embodiment described herein below.

Production Environment 200

Receiving Data from Partners

In accordance with the present invention, it is preferable for partners to communicate data to the search engine site via a data feed 202 that comprises ASCII flat file or other formatted data containing data representative of the goods or services provided. The partner data files are preferably updated regularly and on an "as needed" basis in accordance with the partner's business.

For example, the data received from Expedia preferably contains keyphrases in the following exemplary format:

Cities (Expe-Cities.txt)—a text file that contains a list of the cities for which Expedia has hotels.

States/Regions—(Expe-States.txt)—a text file that contains a list of the states and regions for which Expedia has hotels.

Hotel Brands (Expe-HotelBrands.txt)—a text file that contains a list of the hotel brands for which Expedia has hotels.

Hotel Names (Expe-HotelNames.txt)—a text file that contains a list of the hotel names known by Expedia.

After the receiving the partner's content, it may be necessary to build a model that represents the type of queries that the given partner can answer and establish the normalized forms for the partner's data types. To build such a model, the partner's search submission form is examined to determine what slots must be filled (e.g., city, state, dates, etc.). A data file of one value per line may be created for each slot. The values are preferably an exhaustive list of values in the partner's database for the slot. Further, it may be preferable to coordinate with each partner to obtain sample data for each slot. In addition to the above, the "Class" of the data also needs to be preserved. The class is evaluation information on how to fill the slot (e.g. the term extracted for "CITY" should be placed in the CITY slot or it may not work).

The data is next loaded into a staging database 208, and a data structure is built to allow the original value and the slot to be indexed by all possible values, as described below with respect to the synsets, which are groups of words that are known to be synonyms or variations of terms (e.g. the synset for "Las Vegas" contains "Las Vegas, Vegas, LasVegas [nospace]).

Scrub the File

Scrubbing eliminates duplicates and reduces "display forms" of values to "search forms." A display form is a form that is found in a partner's database and is optimized for display to a user. A search form is a form that a user is likely to type in when doing a search. For example "The Venetian Hotel, Resort, and Casino" is a display form while "Venetian Hotel" is a search form.

The data may be scrubbed to delete keyphrases that fall within a stopwords list. The stopwords list includes all stop words (e.g. and, but, or, the) normally used for search plus the words "city" and "state." In addition, the files may be manually scrubbed to remove terms that are known to cause problems. Formal rules for manual scrubbing may be developed, such as removing the word "hotel" or any other term in the Hotel Synset (described below) from entries in the hotel name and hotel brand list (e.g., "Hyatt Hotel" becomes "Hyatt").

Import/Export

The scrubbed list may then be expanded by adding relevant editorially created synsets (editorial input 206). The synsets define lists of the most common forms of terms and phrases. The synset group is a group of synsets that are logically related (e.g., terms that represent a concept such as a city, state, etc.) and that contain data appropriate for the slot. In the context of the present invention, the synsets are a list of terms that all mean the same thing and that match a value. If a synset of a value is found, all keyphrases in the synset are added as keywords to the data structure. Otherwise, the value is added as a keyword for the value. For example, a synset for Philadelphia would contain several variants of the city name (e.g., Philly, Phila., PHL, "City of Brotherly Love," etc.), and those variants would be supported as well. In the present Expedia example, a Hotel Synset is created that contains all the variations of words that mean hotel (e.g. hotel, motel, inn, lodge, etc.). The variations may include synonyms, common typographical errors, etc. For example, suppose that Expedia includes "Best Western" in the list of hotel brands and that there is a Best Western synset with the following variations: "Best Western," "BestWestern," "BestWestern.com," "BestWesternHotel," "BestWesternMotel." The term "Best Western" from Expedia would be mapped to the Best Western Synset so that all the variations of Best Western noted above in the synset would be recognized.

The synset group is used to narrow the scope of the matching for synsets to improve accuracy. For example, an ambiguous term may be "Chicago." The tem may match the synset for Chicago the city and Chicago the band and hence it must be determined which synset to use. However, this problem can be avoided if it is known that all the terms being match are cities, then the search may be restricted to only synsets that are cities. This is done by having a synset group of "cities" which contains synset for things that are known to be cities. For example, loading the data can be performed using a cities files that contains only cities, thus it is possible to restrict the synset matching to synsets in the cities synset group.

When a term is associated to an editorially created synset, the present invention maintains the spelling of the term that was provided by the partner. This spelling is considered the "normalized" version that will be passed to the partner as a parameter when any of the terms in the synset are matched. In the example above, the query "BestWesternHotels" would be normalized to "Best Western" since "BestWesternHotels" matched a term in the Best Western Synset and the term provided by Expedia that was associated with the synset was "Best Western." In the event that no editorial synsets exist, the present invention will match on the partner's term only.

Entries are also preferably made for trigger words, associated words and forbidden words. Trigger words are words that do not correspond to a partner's slot but carry the weight of a word that would fill a slot for matching purposes. For example, in a hotel query, a trigger set of "HOTEL" would be created and words that mean hotels (hotels, motels, etc.) would be keywords for this entry. That allows a query of "Seattle Hotels" to be recognized as a hotel query even though there may not be an explicit slot for hotels. Associated words are a set of terms that are counted as matches to terms, but are not used in the decision ranking algorithms (described below). These are words that are known to be refinements to a query but do not by themselves constitute a valid query. The word "cheap" in the query "cheap Las Vegas Hotels" is such a word. Forbidden words are a synset of terms that are known to cause false positives for federation.

The file lists may then be transferred (export 210) to a query engine by converting it into a file format defined for the interchange of information between the staging database and the query engine. Once exported, the hosting query server directory engine 256 is modified such that when processing a query at runtime, it issues the query against the staging database 208.

Runtime 250

User searches 252 are entered as queries at the search engine's web server 254. The terms are then extracted and normalized. The staging database 208 is referenced to find all substrings of the query that match values in the database. For example, if the database 208 contained the values "Las Vegas" for cities "Bellagio" for hotels, and the a trigger of "hotel," the query "Las Vegas Bellagio Hotel" would return a hit for the city "Las Vegas," a hit for the hotel "Bellagio," and a hit for the hotel trigger hotel of "hotels."

The extracted terms are then examined to select the appropriate value for each slot. This step is performed because same value could appear in multiple slots. For example, consider the query "Paris Hotel Las Vegas." The extraction process would yield a city of "Paris," a city of "Las Vegas", a hotel trigger of "Hotel" and a hotel of "Paris." This step would determine that they are city of "Las Vegas" and hotel of "Paris."

The values are then normalized to the term that was provided by Expedia. If the recognized term form the query was malformed, it is normalized to a properly formed query. For example, if data structure contained the value "las vegas" with the slot city and the keyphrase "lasvegas," the query "lasvegas hotels" would match this entry since it matched the keyphrase. The value field of the entry would then be substituted since it was the normalized version of the value.

This step also identifies terms in the user query that might be related to Expedia content and the class of those terms.

For example, assuming the following training data:
Cities: Paris, Las Vegas, Las, Vegas
Hotels: Paris
Hotel Synset Hotel
Forbidden: Airport
Associated: Cheap The query "Paris Hotel Las Vegas" would result in the following term and class identification:
Paris—City
Paris—Hotel Name
Las Vegas—City
Las—City
Vegas—City
Hotel—Hotel Synset Federation Decision To determine if a query is to be federated to a partner site 258 for resolution, matches for term classes are assigned the weights. An exemplary set of weights to federate to Expedia may be as follows:
CITY—Weight 0.5
HOTEL BRAND—Weight 0.25
HOTEL NAME—Weight 0.25
STATE—Weight 0.05
HOTEL SYSNET—Weight 0.25

Other weights may be used to tune the system. If the sum of all the weights for a particular query is, e.g., equal to or greater than 0.75, then the query will be passed to Expedia. In order to federate to the partner, a certain critical mass of "slots" is also required. For example, for Expedia hotels, a city and one or more of a hotel trigger, hotel brand name, or hotel name needs to be extracted in order to federate.

However, if enough slots were filled, but the extracted terms, associated terms and trigger terms do not consume enough of the query, the likelihood that partner is a good match for the query is low. To handle this, a "nomatch" score is calculated. This is the percentage of the words in the query that were not matched against the slot values, associated values, and trigger values. If this is above a threshold, the query is considered as not having extracted enough slots. This score is computed by determining how many words in the query did not match one of the synsets for cities, states, hotels, brands, associated values, or hotel synset and then dividing that by the total number of words in the query. This means that the scale of the threshold is between 0 and 1, wherein 0 means that no "no match" words are allowed and 1 means that the entire query could contain no match words. To begin with, the nomatch score threshold is 0.35 (35%). This means that if a query has a nomatch score greater than 0.35, the present invention will not federate. Words that match the associated synset are counted as "matched" words in this computation. This threshold is tunable and may be some other threshold than 0.35. Likewise, if any values from the forbidden list are extracted, the query is considered to have not extracted enough slots.

For exemplary purposes, consider the following examples:
Training Data:
Cities: Hilton Head
Brands: Hilton, Hyatt
Hotel Synset Hotel, Hotels
Query:
Hilton Head Hotels In this first example, the extracted city would be Hilton Head and the extracted brand would be Hilton. However, since Hilton and Hilton Head come from the same substring of the query, only one of them can be used. Hilton Head is the longer of the two, so it is used for the extracted city. If the query contained another brand, that brand may be used. If no other brand was contained in the query, then there would be no brand extracted. To illustrate this, consider the case above with the query Hilton Head Hyatt. In this case, the brand Hyatt is not contained as a substring of Hilton Head and hence is used as the brand.

In the event where the same substring is identified in multiple term classes, the term class is selected in the following priority order:
City
State
Hotel Brand
Hotel Name Other rankings of classes may be used to tune the present invention in accordance with a relevance requirement of the searches to be federated.

To illustrate this, consider the following example:
Training Data:
Cities: Paris, Las Vegas
Hotels: Paris
Brands: Hilton
Hotel Synset Hotel, Hotels
Query:
Paris Hotels In this example, a candidate city of Paris and a candidate hotel of Paris are identified. Since these are the same substring, the priority order is used, which specifies that Paris will be extracted as a city and no hotel would be extracted. Note that if the query were Paris Hilton Hotels, Paris would have been selected as the city by the same rationale and then Hilton would be selected as the brand since it was not part of the substring. This also means that for the query New York Hotels, the name New York would be extracted as a city rather than a state since the string represents both a city and a state and the city is higher on the priority scale.

In the case where multiple choices are available for the same slot, the less ambiguous choice is selected. For example, consider the query "Paris Hotel Las Vegas". The matching process identifies two candidate cities, "Paris" and "Las Vegas". In this case, "Las Vegas" is the less ambiguous choice, as it is only a candidate for city, which "Paris" is a candidate for both city and hotel name. Therefore, "Las Vegas" is selected to fill the city name slot, while "Paris" is used as the hotel name.

Federation

Federation is performed by placing the extracted normalized values into a predefined URL template and performing an HTTP GET (or equivalent) on that template to execute the search against the partner's database. The partner site 258 processes the request and preferably returns XML data that includes all results that matched the query or indicates that there were no results. This query is executed by a proxy that managed connecting to the partner's site and handles failure cases to insulate the system for connectivity problems or partner site problems.

After the query is formulated, it is executed. There are three possible results from the execution. In the first, Expedia Returns a Result. In this case, Expedia has an answer for the query and has returned an XML result that will be displayed to the end user as described below with respect to FIGS. 3-10. The second result is that Expedia does not return a result. In this case, Expedia does not have an answer for the query and no result is displayed to the end user. The third result is that Expedia times out. In this case, the present invention is unsure what the problem is and has not obtained any data, thus no result is displayed. A timeout may be logged in a log counter 204 for monitoring.

After a result is returned from the partner, it is rendered. This step converts the XML returned by the partner into HTML for display to the user. A user interface is rendered by applying an XSLT transform to the XML returned by Expedia. Exemplary user interfaces will be described below.

Exemplary Scenarios

Figure 10:
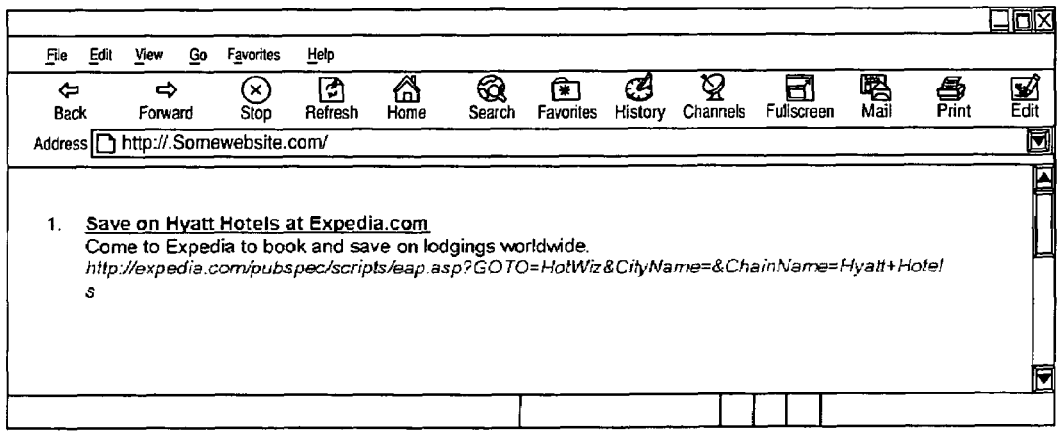

As illustrated in FIGS. 3-10, there are several scenarios that manifest themselves in different forms of the UI. These scenarios are a Special Rate City Query (FIG. 3), Special Rate City Brand Query (FIG. 4), Hotel Details Query (FIG. 5), Non-Special Rate City Query (FIG. 6), Non-Special Rate City Brand Query (FIG. 7), Non-Special Rate Hotel Details Query (FIG. 8), Non-Special Rate Hotel Details Query—No Picture (FIG. 9), and a Brand Query (FIG. 10). As shown in FIGS. 3-10, the displayed results may include pictures or other details in accordance with special rates/agreements between Expedia (or other partner) and the hotel (or other goods or service providers).

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of federated searching implemented by a computer, comprising:
receiving a user query at a first location;
extracting terms from the user query by parsing the terms from the user query on a term-by-term basis, determining if any terms in the user query are relevant to individual slots utilized by a search facility of a second location, and for those terms that are determined to be relevant to individual slots, filling those slots with the relevant terms;
assigning the user query a ranking based on a weight assigned to at least a portion of the extracted terms;
sending the user query to the second location for searching if the ranking of the user query meets a predetermined threshold and searching the user query at the second location;
searching the user query at the first location if the query value does not meet the predetermined threshold; and receiving a response from one of the first location or the second location.

2. The method of claim 1, wherein determining if terms in the user query are relevant comprises referencing a staging database to find all substrings of the user query.

3. The method of claim 1, further comprising normalizing the terms within the user queries to forms such that the second location can interpret the user query.

4. The method of claim 3, wherein normalizing comprises at least one of:
   correcting spelling errors in the user query;
   correcting spacing errors in the user query;
   compensating for the use of synonyms or other variations; and
   determining a class of the terms within the user query.

5. The method of claim 1, wherein sending the user query to the second location is performed only if a predetermined number of slots are filled by terms within the user query.

6. The method of claim 5, further comprising determining a nomatch score, wherein the nomatch score is a percentage of the words in the user query that were not matched against the slot values, and wherein if the nomatch score is above a predetermined nomatch threshold the user query is not sent to the second location.

7. The method of claim 1, wherein extracting terms further comprises normalizing and identifying a class of the terms.

8. The method of claim 7, further comprising ranking the terms by assigning a weight to each class of terms and using the weights to determine the ranking.

9. The method of claim 7, wherein the classes of terms are prioritized.

10. The method of claim 1, wherein sending the user query to the second location for searching comprises placing the extracted terms into a predetermined URL template.

11. The method of claim 10, wherein receiving a response from the second location comprises receiving an XML formatted response from the second location and rendering it for display.

12. A tangible computer-readable medium having computer-executable instructions stored thereon for:
   receiving a user query at a first location;
   extracting terms from the user query by parsing the terms from the user query on a term-by-term basis, determining if any terms in the user query are relevant to individual slots utilized by a search facility of a second location, and for those terms that are determined to be relevant to individual slots, filling those slots with the relevant terms;
   assigning the user query a ranking based on a weight assigned to at least a portion of the extracted terms;
   sending the user query to the second location for searching if the ranking of the terms meets a predetermined threshold and searching the user query at the second location;
   searching the user query at the first location if the ranking of the user query does not meet the predetermined threshold; and
   receiving a response from one of the first location or the second location.

13. The computer-readable medium of claim 12, wherein determining if terms in the user query are relevant comprises referencing a staging database to find all substrings of the user query.

14. The computer-readable medium of claim 12, further comprising normalizing the terms within the user queries to forms such that the second location can interpret the user query.

15. The computer-readable medium of claim 14, wherein normalizing comprises at least one of:
   correcting spelling errors in the user query;
   correcting spacing errors in the user query;
   compensating for the use of synonyms or other variations; and
   determining a class of the terms within the user query.

16. The computer-readable medium of claim 12, wherein sending the user query to the second location is performed only if a predetermined number of slots are filled by terms within the user query.

17. The computer-readable medium of claim 16, further comprising determining a nomatch score, wherein the nomatch score is a percentage of the words in the user query that were not matched against the slot values, and wherein if the nomatch score is above a predetermined nomatch threshold the user query is not sent to the second location.

18. The computer-readable medium of claim 12, wherein extracting terms further comprises normalizing and identifying a class of the terms.

19. The computer-readable medium of claim 18, further comprising ranking the terms by assigning a weight to each class of terms and, using the weights to determine the ranking.

20. The computer-readable medium of claim 18, wherein the classes of terms are prioritized.

21. The computer-readable medium of claim 12, wherein sending the user query to the second location for searching comprises placing the extracted terms into a predetermined URL template.

22. The computer-readable medium of claim 21, wherein receiving a response from the second location comprises receiving an XML formatted response from the second location and rendering it for display.

23. A method of federated searching implemented by a computer, comprising:
   receiving a user query at a first location, said user query containing terms for conducting a search;
   extracting terms from the user query before conducting said search, wherein said extracting includes,
      parsing the terms from the user query on a term-by-term basis,
      determining if any terms in the user query are relevant to individual slots utilized by a search facility of a second location by referencing a staging database to find all substrings of the user query, and
      for those terms that are determined to be relevant to individual slots, filling those slots with the relevant terms;
   assigning the user query a ranking based on a weight assigned to at least a portion of the extracted terms,
   wherein if the ranking of the user query meets a predetermined threshold,
      sending the user query to the second location and searching the user query at the second location, wherein the terms are normalized to forms that the second location can interpret, otherwise,
   searching the user query at the first location if the ranking of the user query does not meet the predetermined threshold; and
   receiving a response from the first location or the second location.

* * * * *